United States Patent

Morlion et al.

[11] Patent Number: 5,611,011
[45] Date of Patent: Mar. 11, 1997

[54] ALIGNMENT PIECE FOR A CONNECTOR FOR OPTICAL CONDUCTORS AND METHOD USING SAME

[75] Inventors: Danny Morlion, St. Amandsberg; Luc Jonckheere, Dilbeek; Jan P. K. Van Koetsem, Zwijndrecht, all of Belgium

[73] Assignee: Framatome Connectors International, Paris, France

[21] Appl. No.: 524,383

[22] Filed: Sep. 6, 1995

[30]  Foreign Application Priority Data

Sep. 8, 1994 [NL] Netherlands .......................... 9401458

[51] Int. Cl.⁶ ................................................ G02B 6/38
[52] U.S. Cl. .............................. 385/59; 385/52; 385/71; 385/76; 385/77
[58] Field of Search ................................ 385/49, 51, 52, 385/59, 63, 64, 65, 71, 76, 77, 97, 98, 114, 129

[56] References Cited

U.S. PATENT DOCUMENTS

| | | | |
|---|---|---|---|
| 4,028,162 | 6/1977 | Cherin et al. | 385/98 X |
| 4,142,776 | 3/1979 | Cherin et al. | 385/59 X |
| 4,186,997 | 2/1980 | Schumacher | 385/71 X |
| 5,109,460 | 4/1992 | Baek et al. | 385/115 |
| 5,151,964 | 9/1992 | Carpenter et al. | 385/98 |
| 5,155,781 | 10/1992 | Doss et al. | 385/71 |
| 5,155,787 | 10/1992 | Carpenter et al. | 385/98 |
| 5,440,657 | 8/1995 | Essert | 385/71 |

FOREIGN PATENT DOCUMENTS

| | | | |
|---|---|---|---|
| 0571037 | 11/1993 | European Pat. Off. | 385/71 X |
| 2822211 | 11/1978 | Germany | 385/71 X |
| WO95/35519 | 12/1995 | WIPO | 385/59 X |

*Primary Examiner*—Brian Healy
*Attorney, Agent, or Firm*—Perman & Green

[57] ABSTRACT

An alignment piece (1, 6) for a connector for optical conductors (9) comprises a support plate (2, 7), a guiding plate (3, 8) which is manufactured with very high accuracy, and one or more alignment channels (4) for the conductors. At least the ends of the alignment channels are formed in the guiding plate. Further a positioning element (11) is provided and the guiding plate (3, 8) is provided with a positioning means (14) for holding the positioning element at a predetermined location with respect to the ends of the alignment channels (4). The positioning element has a supporting area engaging the conductors and determining together with the ends of the alignment channels the angle of inclination of the conductors in the alignment piece.

4 Claims, 5 Drawing Sheets

ALIGNMENT PIECE FOR A CONNECTOR FOR OPTICAL CONDUCTORS AND METHOD USING SAME

BACKGROUND OF THE INVENTION

The invention relates to an alignment piece for a connector for optical conductors, comprising a support plate, a guiding plate manufactured with very high accuracy and one or more alignment channels for the conductors, wherein at least the ends of the alignment channels are formed in the guiding plate.

Such an alignment piece is described in the earlier international application PCT/EP95/02403 of the same applicant. As described in this application, the conductors are mounted in the alignment channels of the alignment piece and subsequently fixed in the alignment piece by embedding. In order to guarantee an optimal connection between conductors of connectors to be interconnected it is important that the conductors are fixed in the alignment piece under a predetermined angle of inclination.

The invention aims to provide an alignment piece of the above-mentioned type wherein before embedding the conductors are held under the desired angle of inclination in the alignment piece in an accurate manner.

SUMMARY OF THE INVENTION

The alignment piece according to the invention is provided with a positioning element and in the guiding plate is provided with a positioning means for holding the positioning element at a predetermined location with respect to the ends of the alignment channels, wherein the positioning element has a supporting area engaging the conductors and determining together with the ends of the alignment channels, the angle of inclination of the conductors in the alignment piece.

As the positioning means is part of the guiding plate, this positioning means lies very accurately at a predetermined location from the end of the alignment channels. Thereby the positioning element which is preferably also manufactured with very high accuracy, can determine very accurately together with the ends of the alignment channels the angle of inclination of the conductors in the alignment piece.

The invention further provides a method for applying optical conductors in the described alignment piece, wherein each conductor is shifted into an alignment channel from the end opposite of the end in the guiding plate until the end of the conductor projects above the surface of the guiding plate. After applying the conductors a positioning element is mounted in the alignment piece in a hollow space of the support plate, wherein said positioning element is held at a predetermined location with respect to the ends of the alignment channels by positioning means of the guiding plate. The positioning element engages the conductors with a supporting area, wherein the ends of the alignment channels and the supporting area of the positioning element determine the angle of inclination of the conductors in the alignment piece.

BRIEF DESCRIPTION OF THE DRAWINGS

The invention will be further explained hereinafter by reference to the drawings in which some embodiments of the alignment piece according to the invention are schematically shown.

DETAILED DESCRIPTION OF THE PREFERRED EMBODIMENTS

Figure 1:
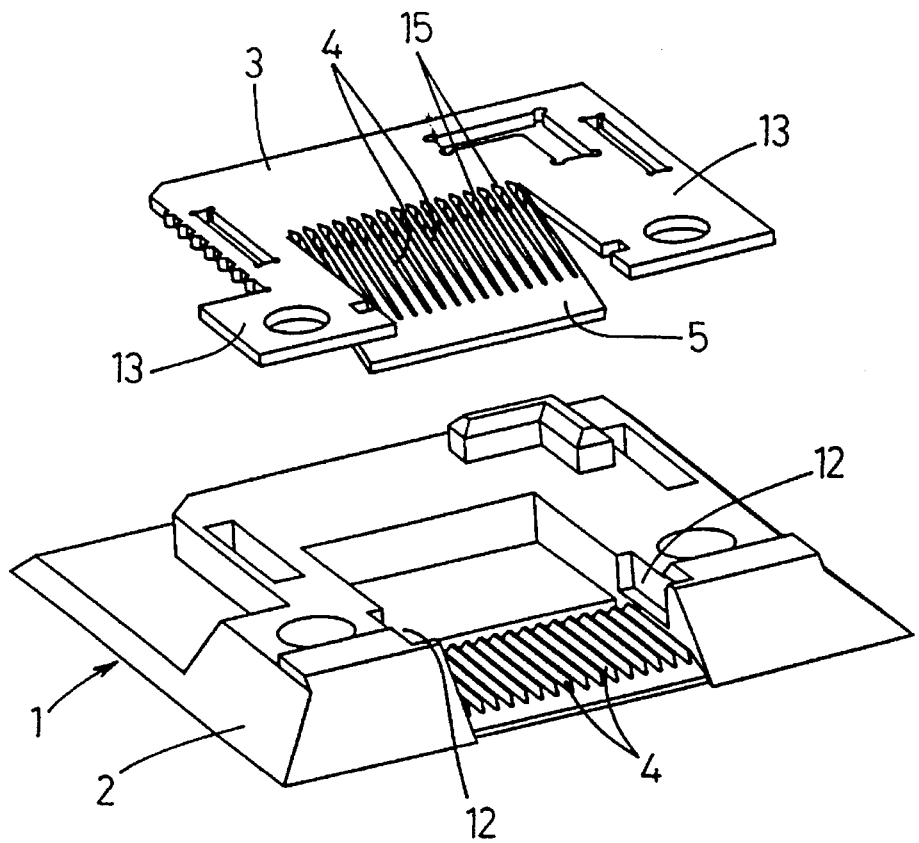
FIG. 1 is a perspective view of a first embodiment of an alignment piece according to the invention intended for embedding in a printed circuit board, wherein the guiding plate is shown separate from the support plate.
Figure 2:
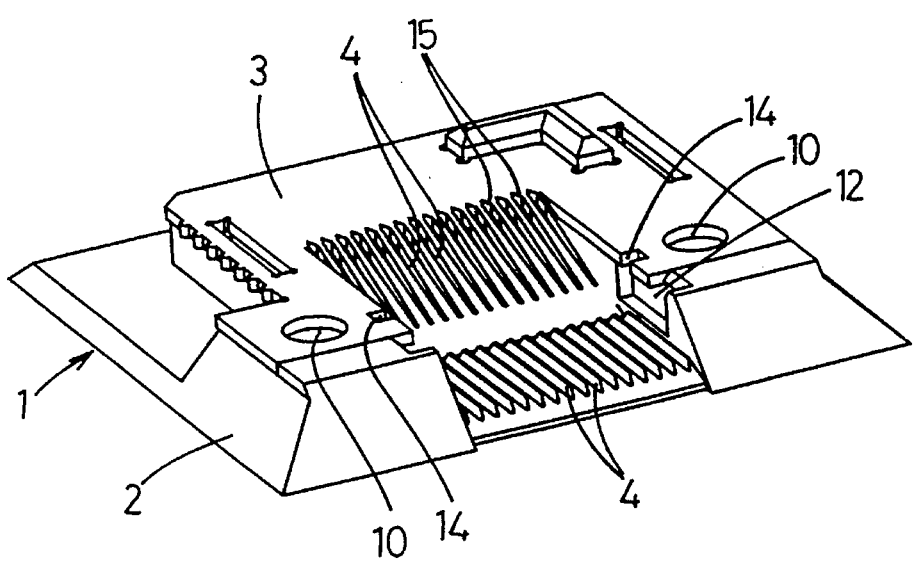
FIG. 2 shows the alignment piece of FIG. 1 wherein the guiding plate is attached to the support plate.

FIG. 1 shows an alignment piece 1 for a connector for optical conductors, said alignment piece comprising a support plate 2 and a guiding plate 3. The support plate 2 is manufactured with usual techniques for example of plastic material, whereas the guiding plate is manufactured with very high accuracy, for example by means of the LIGA-technique. For a further explanation of the alignment piece described reference is made to the earlier international patent application PCT/EP95/002403.

The alignment piece 1 is provided with a plurality of alignment channels 4 for the conductors. In the embodiment shown the alignment channels extend partly in the support plate 2 and partly in an oblique guiding plate part 5.

Figure 3:
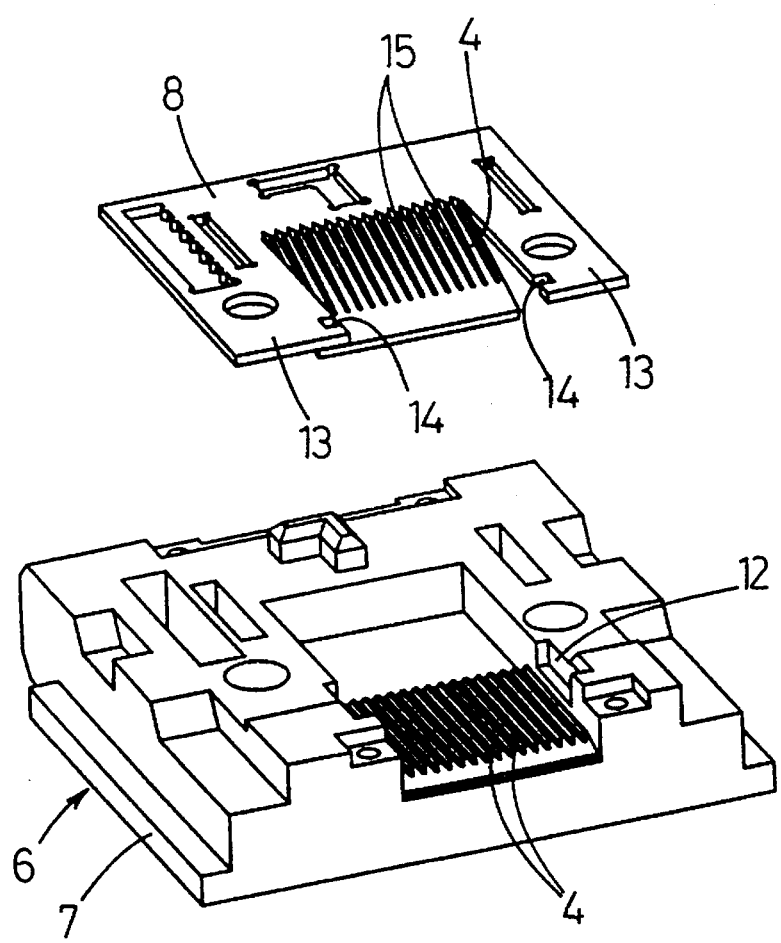
FIG. 3 shows a second embodiment of an alignment piece according to the invention intended for a free connector wherein the guiding plate is shown separate from the support plate.
Figure 4:
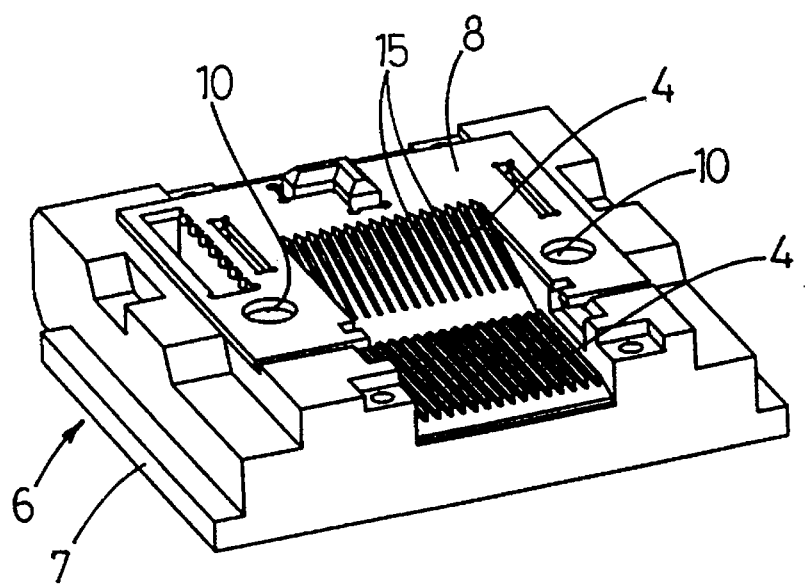
FIG. 4 shows the alignment piece of FIG. 3 wherein the guiding plate is attached to the support plate.

FIGS. 3 and 4 show an alignment piece 6 intended for a connector to which a flat cable or a flexible printed circuit board can be connected. The alignment piece 6 is assembled in the same manner as the alignment piece 1 from a support plate 7 and a guiding plate 8 and comprises alignment channels 4.

Figure 9:
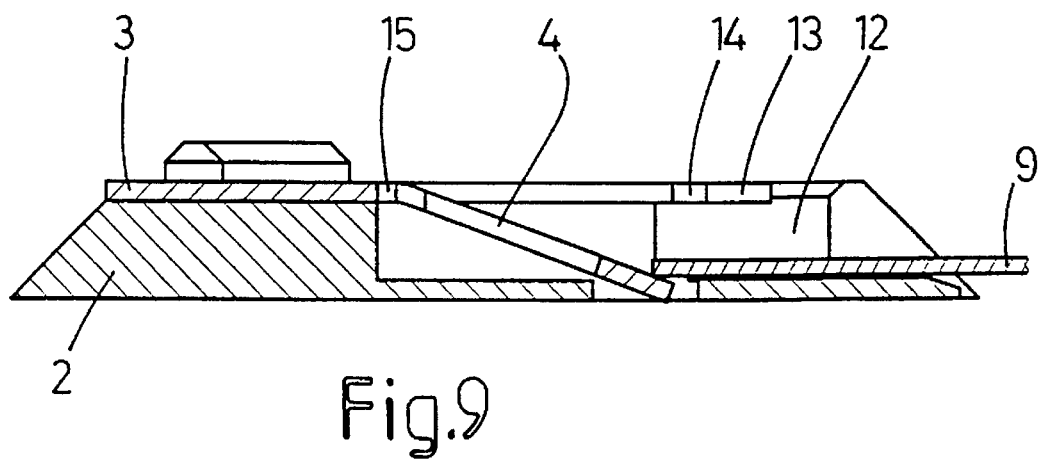
FIGS. 9–11 show schematical cross-sections of the alignment piece of FIG. 1 to explain the mounting of the positioning element.
Figure 10:
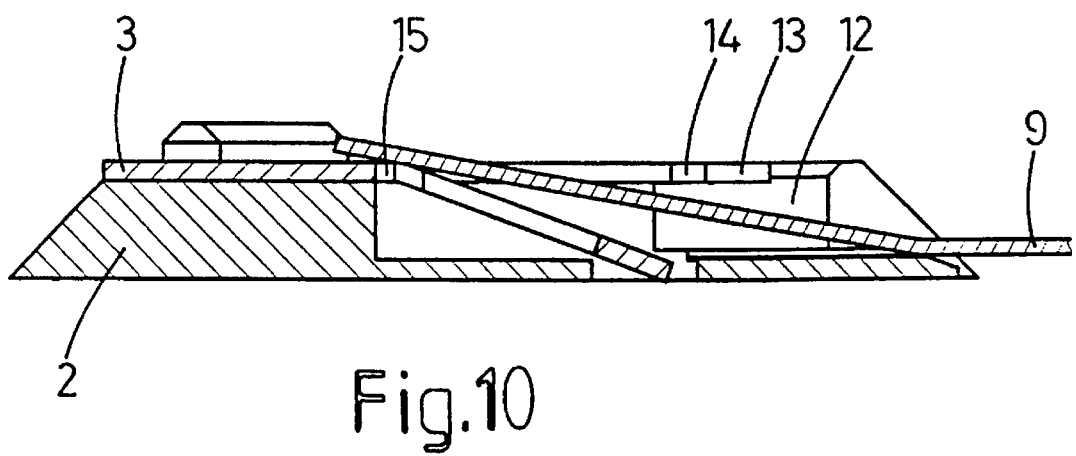
Figure 11:
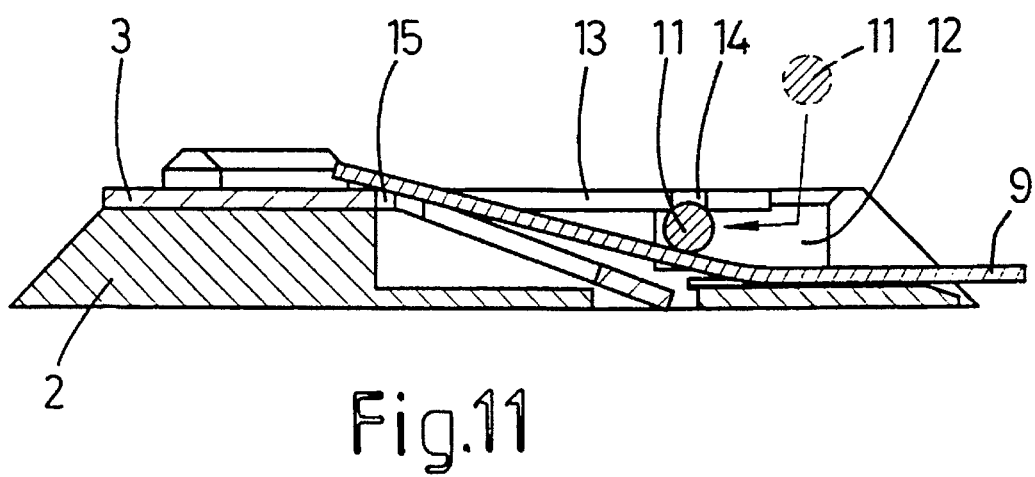

In FIGS. 5–8 several phases are shown of the mounting of conductors 9 in the alignment channels 4 of the alignment piece 1. FIGS. 9–11 show a cross-section of the alignment piece 1 for explaining the method of the invention. Mounting the conductors in the alignment piece 6 takes place in the same manner and will not be described in detail separately.

Figure 5:
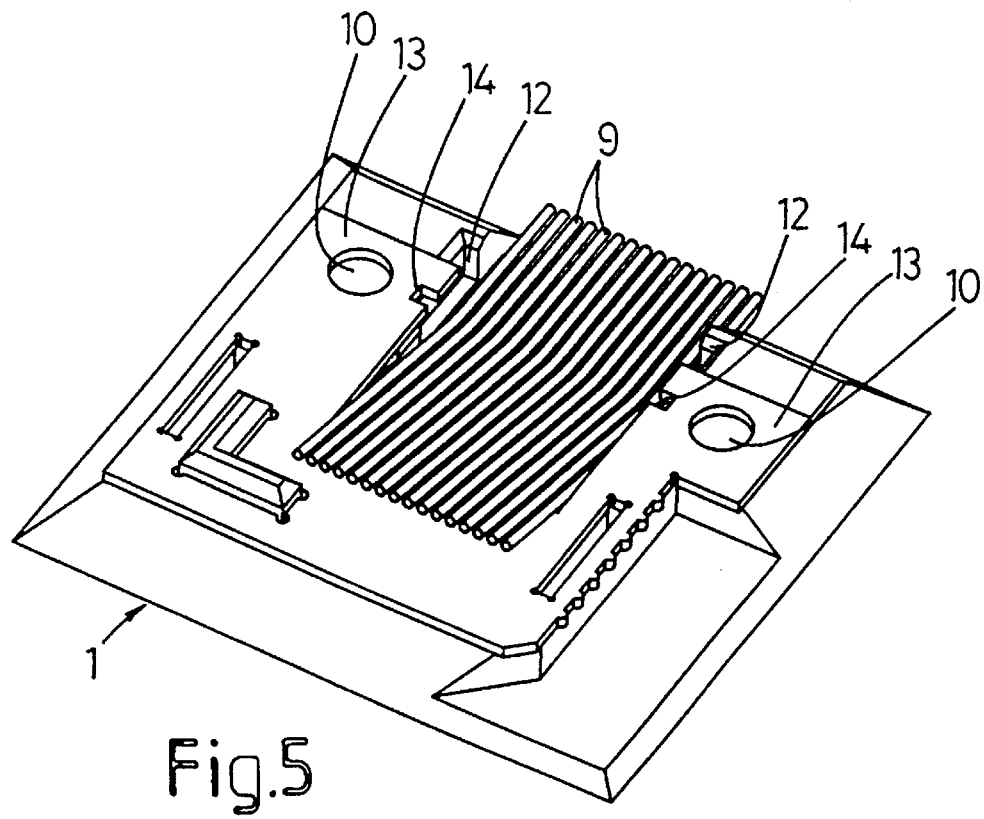
FIG. 5 shows a perspective view of the alignment piece of FIG. 1 wherein conductors are disposed in the alignment channels.
Figure 6:
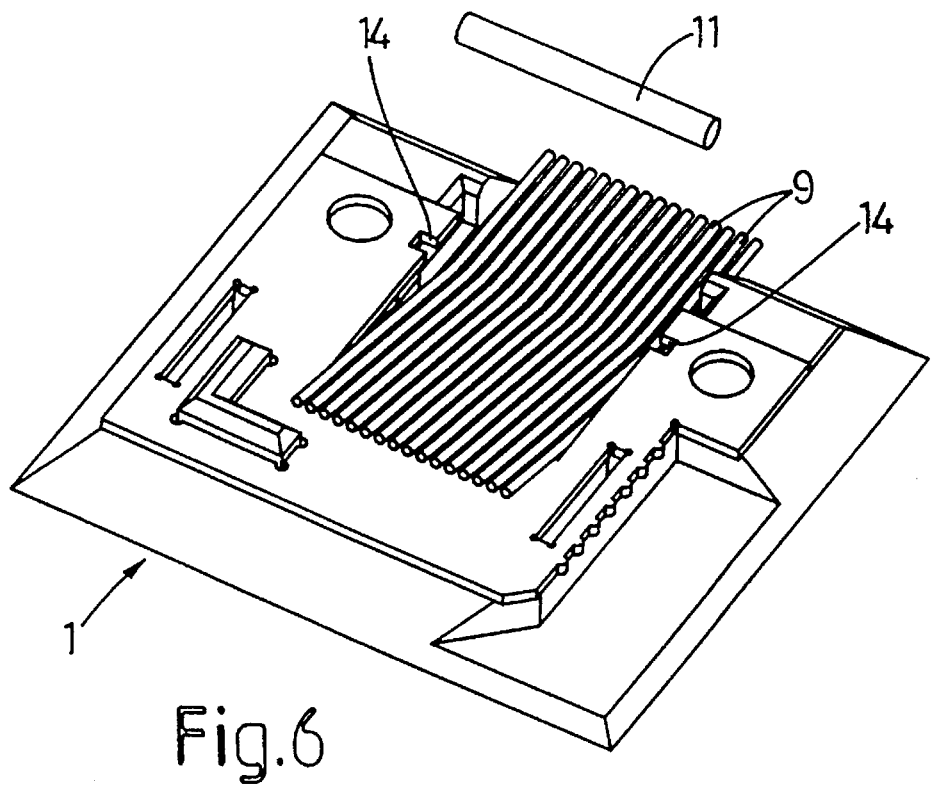
FIG. 6 shows the alignment piece of FIG. 5 wherein the positioning element is shown free from the alignment piece.
Figure 7:
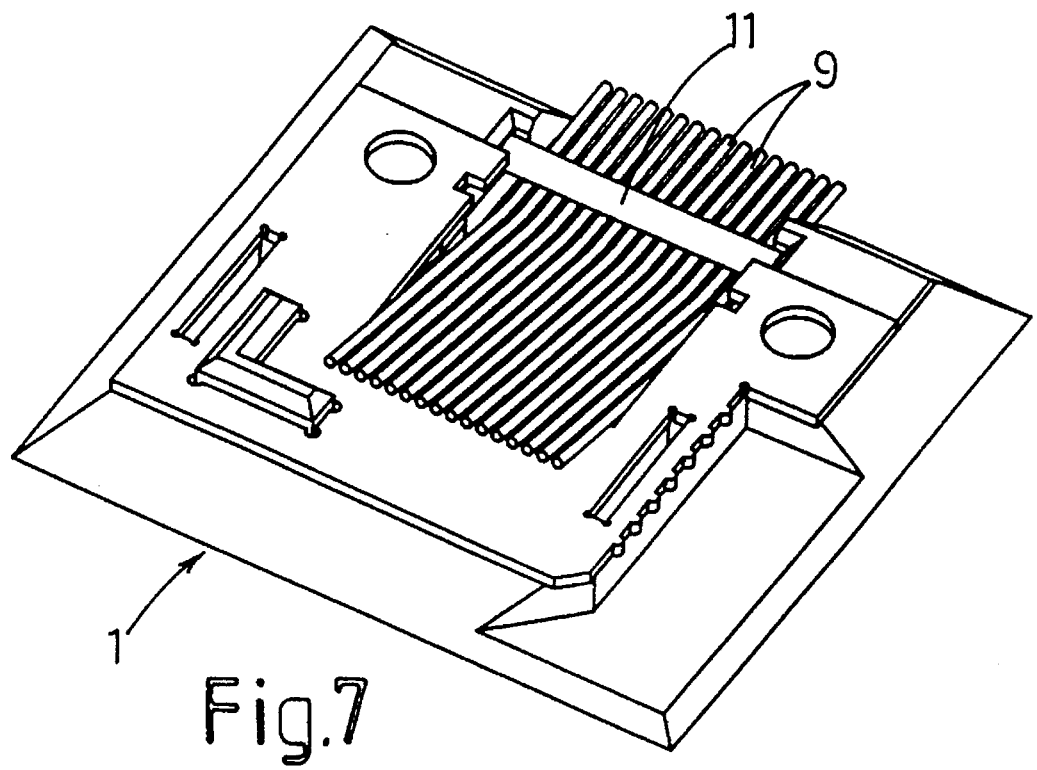
FIG. 7 shows the alignment piece of FIG. 5 during mounting the positioning element.
Figure 8:
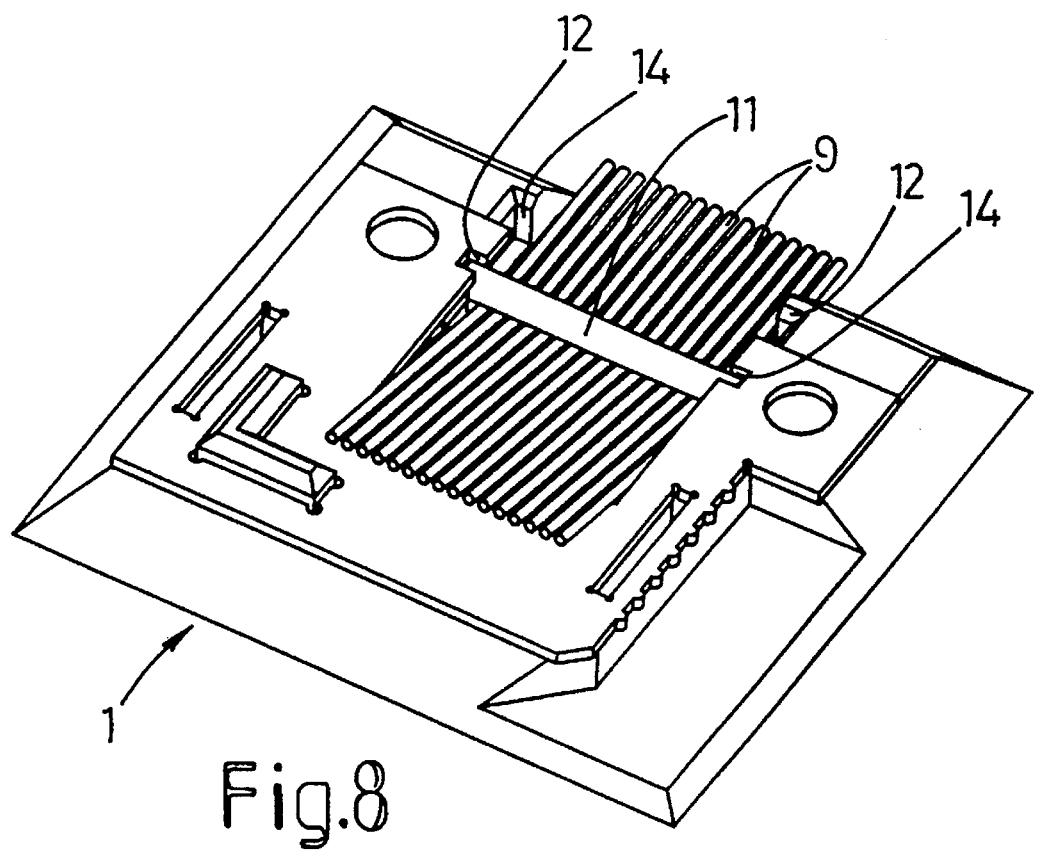
FIG. 8 shows the alignment piece of FIG. 5 wherein the positioning element is provided at its location.

As described in the earlier international patent application PCT/EP95/02403 the alignment piece 1 is placed with positioning openings 10 on positioning pins of a wiring table not shown. Thereafter the conductors 9 made as optical fibres in this case are pushed into the alignment channels 4, wherein the part of the alignment channels in the support 2 provides a rough pre-alignment and the ends of the alignment channels in the guiding plate 3 determine the location of the conductors 9, in particular of the contact pads of the conductors which are formed by polishing as described in the patent application PCT/EP95/02403. Pushing the conductors 9 into the alignment channels 4 is schematically indicated in FIGS. 9 and 10. FIG. 5 shows a perspective view of the alignment piece 1, wherein all conductors 9 are placed in the alignment channels 4.

In order to guarantee a good connection between the conductors of the alignment piece 1 and the alignment piece 6, it is important that the angle of inclination of the conductors in the alignment piece 1 and 6, respectively, is fixed accurately. In this embodiment the desired angle of inclination is 14°. According to the invention the alignment piece 1 is provided with a positioning element 11 for determining the angle of inclination. This positioning element 11 is manufactured with sufficiently high accuracy. In the embodiment shown the positioning element 11 is a round bar which after mounting the conductors 9 is provided in the alignment piece 1. For mounting the positioning element 11 the support plate 2 is provided with recesses 12 which are partly located below legs 13 of the guiding plate 3. Through the recesses 12 the positioning element 11 is pushed under the legs 13 of the guiding plate 3 and is held at a predetermined location by positioning means made as recesses 14 in the guiding plate. Because the recesses 14 are formed in the guiding plate 3 these recesses 14 are located at a location predetermined with very high accuracy with respect to the ends of the alignment channels 4 in the surface of the guiding plate 3 made as V-shaped slots 15. When the positioning element 11 lies at its location in the recesses 14, the positioning element 11 presses with a supporting area on the conductors 9. This supporting area of the positioning element 11 together with the ends 15 of the alignment channels 4 determines the angle of inclination of the conductors 9 in the alignment piece 1. Thereby this angle of inclination is determined with very high accuracy.

It will be understood that mounting the conductors in the alignment piece 6 and mounting the positioning element 11 in the alignment piece 6 occurs in the same manner as in the alignment piece 1.

In the described embodiments of the alignment piece according to the invention the alignment piece comprises a support plate and a guiding plate made as separate parts. Within the scope of the invention it is however also possible to manufacture the alignment piece with support plate and guiding plate as a unit. When it is noted in the description and claims that the alignment piece is provided with a support plate and a guiding plate, these parts can therefore be made as a unit.

The invention is not restricted to the above-described embodiment which can be varied in a number of ways within the scope of the claims.

We claim:

1. Alignment piece for a connector for one group of optical conductors, comprising a support plate, a guiding plate manufactured with very high accuracy and one or more alignment channels for the conductors, said alignment channels each having an entrance end for the corresponding conductor at a lower level in the support plate and an exit end for the corresponding conductor at a higher level, the exit ends of the alignment channels being formed in the guiding plate, and a positioning element, wherein the guiding plate is provided with a positioning means for holding the positioning element at a predetermined location with respect to the exit ends of the alignment channels, said positioning element having a supporting area engaging the conductors between the entrance and exit ends of the alignment channels and determining, together with the exit ends of the alignment channels, an angle of inclination of the conductors in the alignment piece between the entrance and exit ends of the alignment channels.

2. Alignment piece according to claim 1, wherein the positioning means comprises a recess in the guiding plate at both sides of the alignment channels and in that the positioning element is made as a rod with a predetermined diameter.

3. Method for applying optical conductors in an alignment piece, comprising the step of providing an alignment piece for a connector one group of optical conductors, the alignment piece comprising a support plate, a guiding plate manufactured with very high accuracy, one or more alignment channels for the conductors, said alignment channels each having a entrance end for the corresponding conductor at a lower level in the support plate and an exit end for the corresponding conductor at a higher level, the exit ends of the alignment channels being formed in the guiding plate, and a positioning element, wherein the guiding plate is provided with a positioning means for holding the positioning element at a predetermined location with respect to the exit ends of the alignment channels, said positioning element having a supporting area engaging the conductors between the entrance and exit ends of the alignment channels and determining together with the exit ends of the alignment channels, an angle of inclination of the conductors in the alignment piece between the entrance and exit ends of the alignment channels, wherein each conductor is shifted into one of the alignment channels from said entrance end until a free end of the conductor projects from said exit end and above a surface of the guiding plate, wherein after applying the conductors the positioning element is mounted in the alignment piece in a hollow space of the support plate, wherein said positioning element is held at a predetermined location with respect to the exit ends of the alignment channels by positioning means of the guiding plate, wherein the positioning element engages the conductors with a supporting area between the entrance and exit ends of the alignment channels, wherein the exit ends of the alignment channels and the supporting area of the positioning element determine the angle of inclination of the conductors in the alignment piece.

4. An optical conductor alignment piece for a connector comprising:

a support;

a guide connected to the support, the guide forming conductor alignment channels with the support; and a positioning element inserted between the support and the guide after optical conductors have been located, at least partially, in the conductor alignment channels, the positioning element contacting the optical conductors during insertion of the positioning element between the support and the guide and, cooperating with exit ends of the conductor alignment channels to bend the optical conductors at the positioning element into a predetermined angle of inclination in the alignment piece, wherein the optical conductors positioning element and the exit ends of the channels structurally support a span of the optical conductors therebetween across an open space in the alignment piece.

* * * * *